United States Patent
Kim et al.

(10) Patent No.: US 9,954,697 B2
(45) Date of Patent: Apr. 24, 2018

(54) DEVICE AND METHOD FOR DETERMINING CHANNEL EQUALIZATION AND RECEPTION DATA OF RECEIVER FOR PACKET COMMUNICATION

(71) Applicant: Korea Institute of Ocean Science Technology, Ansan-si, Gyeonggi-do (KR)

(72) Inventors: Seung Geun Kim, Daejeon (KR); Yong Kon Lim, Daejeon (KR); Chang Ho Yun, Daejeon (KR); Jong Won Park, Daejeon (KR)

(73) Assignee: KOREA INSTITUTE OF OCEAN SCIENCE TECHNOLOGY, Ansan-si, Gyeonggi-Do (KR)

( * ) Notice: Subject to any disclaimer, the term of this patent is extended or adjusted under 35 U.S.C. 154(b) by 0 days.

(21) Appl. No.: 15/106,471

(22) PCT Filed: Dec. 17, 2014

(86) PCT No.: PCT/KR2014/012464
§ 371 (c)(1),
(2) Date: Jun. 20, 2016

(87) PCT Pub. No.: WO2015/093841
PCT Pub. Date: Jun. 25, 2015

(65) Prior Publication Data
US 2016/0337148 A1 Nov. 17, 2016

(30) Foreign Application Priority Data

Dec. 19, 2013 (KR) .................. 10-2013-0159500

(51) Int. Cl.
*H04L 25/03* (2006.01)
*H04L 27/26* (2006.01)

(52) U.S. Cl.
CPC ........ *H04L 25/03019* (2013.01); *H04L 25/03* (2013.01); *H04L 27/2697* (2013.01)

(58) Field of Classification Search
CPC H04L 25/03; H04L 25/03019; H04L 25/2697
(Continued)

(56) References Cited

U.S. PATENT DOCUMENTS 6,584,150 B1 6/2003 Wu et al.
6,862,326 B1 3/2005 Eran et al.
(Continued)

FOREIGN PATENT DOCUMENTS

KR 10-2008-0050244 A 6/2008

*Primary Examiner* — Michael Neff
(74) *Attorney, Agent, or Firm* — Novick, Kim & Lee, PLLC; Sang Ho Lee

(57) ABSTRACT

Provided is an apparatus for equalizing a channel and determining reception data of a packet communication receiver. The apparatus includes: an input interface unit which receives a reception sample string of a packet having a midamble and location information of the midamble; a sample dividing unit which divides the reception sample string into a first sub sample string and a second sub string stream using the location information of the midamble; and a channel equalizing unit which performs channel equalization on the first sub sample string and the second sub sample string, respectively, using a channel equalizing algorithm of the channel equalizer.

10 Claims, 8 Drawing Sheets

(58) Field of Classification Search
USPC .......................................................... 375/232
See application file for complete search history.

(56) References Cited

U.S. PATENT DOCUMENTS

2002/0010896 A1     1/2002    Huttunen
2010/0027526 A1     2/2010    Bultan et al.
2011/0312275 A1    12/2011    Canpolat et al.
2012/0327871 A1*   12/2012    Ghosh .................. H04L 5/0023
                                                       370/329

\* cited by examiner

DEVICE AND METHOD FOR DETERMINING CHANNEL EQUALIZATION AND RECEPTION DATA OF RECEIVER FOR PACKET COMMUNICATION

BACKGROUND

Field

Exemplary embodiments of the present disclosure relate to an apparatus and a method for equalizing a channel and determining reception data in a packet communication receiver.

Description of the Related Art

In a packet transmission method which uses $\pi/4$-DQPSK which is one of differential modulation methods, as a modulation method and has a binary data string called midamble in the middle of the packet, a binary data string of the midamble is a data string which is determined in advance between a transmitter and a receiver. The binary data string is mapped and transmitted as a symbol in accordance with the $\pi/4$-DQPSK modulation method in the transmitter. The $\pi/4$-DQPSK modulation method is one of differential modulation methods and determines a signal to be transmitted for every packet by a transmission data string.

In the transmitter, a $\pi/4$-DQPSK modulation symbol string is transmitted and then passes through a channel to reach the receiver. The receiver may include a channel equalizer to compensate distortion generated in the channel. The receiver has a receiver structure which differentially demodulates an output signal of the channel equalizer to determine transmitted data.

Generally, when an adaptive channel equalizer is used, the equalizer is trained using known symbol strings and corresponding reception signals. The trained equalizer uses reception data to perform channel equalization.

However, when the midamble is used, a symbol string which may be used to train the equalizer is located in the middle of a packet. Therefore, it is difficult to apply a general adaptive channel equalizer algorithm. Further, as mentioned above, due to a characteristic of the $\pi/4$-DQPSK modulation method, midamble symbol strings by the midamble binary data vary for every packet due to the different packet data, so that it is difficult to apply a typical channel equalizer.

The related art is disclosed in Korean Unexamined Patent Application Publication No. 10-2008-0050244 (entitled Apparatus and method for channel equalizing using absolute value of Channel Coefficient and published on Jun. 5, 2008).

SUMMARY

An object of the exemplary embodiment of the present disclosure is to provide an apparatus for equalizing a channel and determining reception data of a packet communication receiver which uses a differential modulation method, performs channel equalization and differential modulation using an output of a channel equalizer in packet reception having a midamble binary data string, and a method thereof.

Technical problems of the present invention are not limited to the above-mentioned technical problems, and other technical problems, which are not mentioned above, can be clearly understood by those skilled in the art from the following descriptions.

An object to be achieved by the present disclosure is to provide an apparatus for equalizing a channel and determining reception data of a packet communication receiver including: an input interface unit which receives a reception sample string of a packet having a midamble and location information of the midamble; a sample dividing unit which divides the reception sample string into a first sub sample string and a second sub string stream using the location information of the midamble; and a channel equalizing unit which performs channel equalization on the first sub sample string and the second sub sample string, respectively, using a channel equalizing algorithm of the channel equalizer.

According to an exemplary embodiment of the present disclosure, the channel equalization may be performed even in packet communication having a midamble using a channel equalizer having a preamble of the related art.

According to an exemplary embodiment of the present disclosure, the receiver can perform channel equalization and differential demodulation by using the reference midamble symbol string in spite of receiving a symbol string whose midamble symbol string has the identical binary data but shifted-phase from the reference midamble symbol string due to the characteristic of the $\pi/4$-DQPSK modulation method.

According to an exemplary embodiment of the present disclosure, when channel equalization is performed using a symbol corresponding to a random data part of a packet in a channel equalizer, a transmission symbol is determined with respect to a $\pi/4$-DQPSK constellation by separating an odd-numbered symbol and an even-numbered symbol. Therefore, the channel equalizer has robustness in determining a transmission symbol. Further, the channel equalizer does not determine a transmission symbol through the processes of differential demodulation and differential modulation, but determines one of available signal sets in the symbol section, thereby reducing a complexity of an operation.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
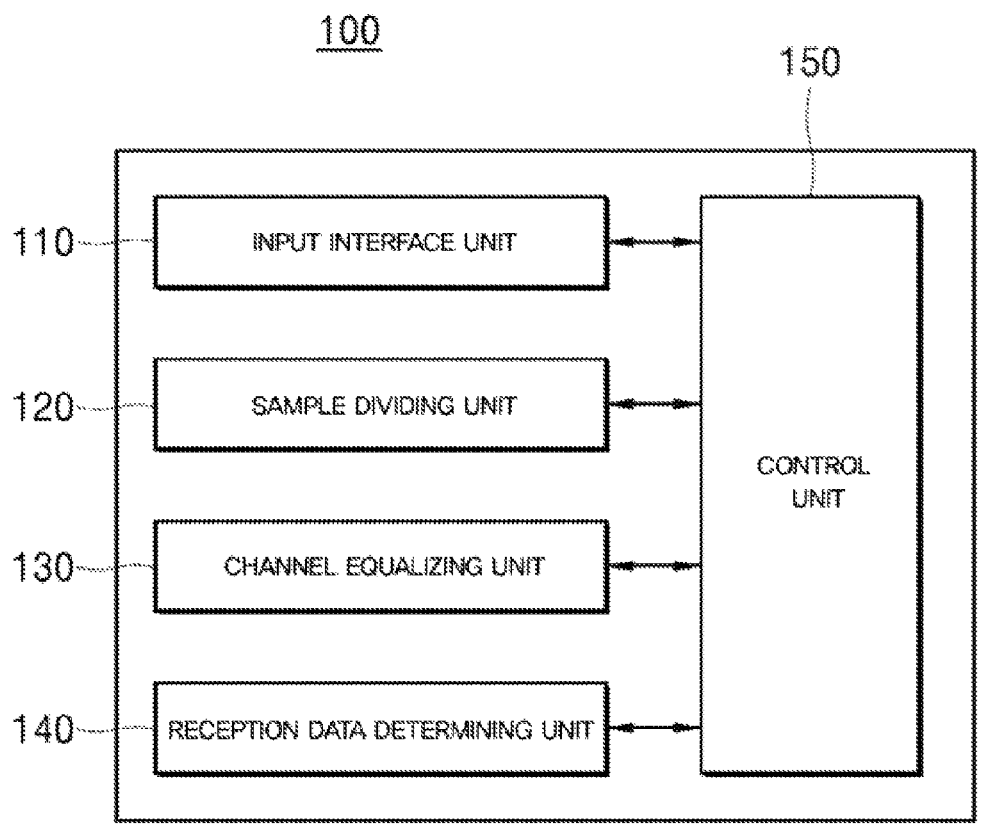
FIG. 1 is a block diagram illustrating an apparatus for equalizing a channel and determining reception data of a packet communication receiver according to an exemplary embodiment of the present disclosure.

An apparatus for equalizing a channel and determining reception data of a packet communication receiver according to an exemplary embodiment of the present disclosure includes an input interface unit which receives a reception sample string of a packet having a midamble and location information of the midamble; a sample dividing unit which divides the reception sample string into a first sub sample string and a second sub sample string using the location information of the midamble; and a channel equalizing unit which performs channel equalization on the first sub sample string and the second sub sample string, respectively, using a channel equalizing algorithm of the channel equalizer.

When the reception sample string is divided, the sample dividing unit may divide the reception sample string so as to superimpose the midamble.

In the first sub sample string, symbol strings are arranged in the order of data 1 and the midamble. In the second sub sample string, symbol strings are arranged in the order of the midamble and data 2.

The channel equalizing unit rearranges the order of the first sub sample string in a reverse order to change the arrangement of the symbol string in the order of a reversely arranged midamble and reversely arranged data 1. The channel equalizer trains a filter coefficient of the channel equalizer using the reversely arranged reference midamble symbol string as a training signal. Further, the channel equalizer performs the channel equalization on the reversely arranged first sub sample string through the filter coefficient using the reversely arranged first sub sample string as an input reception signal of the channel equalizing algorithm of the channel equalizer.

The channel equalizing unit defines a midamble binary data string as first symbol $S(0)=(1+j*0)$, defines a symbol string generated in accordance with a symbol mapping method of $\pi/4$-DQPSK modulation as a reference midamble symbol string. The channel equalizing unit defines the generated reference midamble symbol string which is rearranged in a reverse order as a reversely arranged reference midamble symbol string. The channel equalizing unit uses the reference midamble symbol string or the reversely arranged reference midamble symbol string as a training signal of the channel equalizer.

The channel equalizing unit uses a correctly arranged reference midamble symbol string as a training signal to train a filter coefficient of the channel equalizer. The channel equalizing unit uses the second sub sample string as an input reception signal of the channel equalizing algorithm of the channel equalizer to perform the channel equalization on the second sub sample string through the filter coefficient.

The channel equalizing unit considers that the first sub sample string is virtually rearranged in a reverse order and uses the reversely arranged reference midamble as a training signal to train the filter coefficient of the channel equalizer. The channel equalizing unit uses the first sub sample string as an input reception signal of the channel equalizing algorithm of the channel equalizer to perform the channel equalization on the first sub sample string which is virtually arranged in a reverse order, through the filter coefficient.

The apparatus for equalizing a channel and determining reception data of a packet communication receiver according to an exemplary embodiment of the present disclosure may further includes a determining unit which determines a symbol which is the closest to an output symbol of the channel equalizer in a corresponding symbol section among four candidate symbols of the constellation set of the $\pi/4$ DQPSK signal after the symbol section of the training signal, as a reception symbol in the corresponding symbol section to use the determined symbol as a training signal.

The apparatus for equalizing a channel and determining reception data of a packet communication receiver according to an exemplary embodiment of the present disclosure may further include a determining unit which determines the reception symbol, based on signs of a real part and an imaginary part of an output signal of a filter of the channel equalizer, for a symbol section having one constellation of a constellation set of the $\pi/4$ DQPSK signal, and determines the reception symbol based on a comparison result of absolute values of the real part and the imaginary part of the output signal of the filter of the channel equalizer, for the symbol section having another constellation of the constellation set.

As the channel equalizing algorithm, any one of a minimum mean square (LMS) algorithm, a recursive least square (RLS) algorithm, and a variable step-size (VSS) algorithm may be selectively used.

The apparatus for equalizing a channel and determining reception data of a packet communication receiver according to an exemplary embodiment of the present disclosure may further include a determining unit which uses a last symbol of the reversely arranged midamble of the output symbol string of the channel equalizer by the reversely arranged first sub sample string as a reference symbol of differential demodulation for determining a transmission symbol in the data 1 part and sequentially performs differential demodulation on the reversely arranged subsequent output symbol string of the channel equalizer of the data 1 part to determine transmission data.

The apparatus for equalizing a channel and determining reception data of a packet communication receiver according to an exemplary embodiment of the present disclosure may further include a reception data determining unit which uses a symbol corresponding to the last symbol of the reference midamble of the output symbol string of the channel equalizer by the second sub sample string to a symbol by binary data of data 2 as a reference symbol of differential demodulation for determining a transmission symbol, in the data 2 part and performs differential demodulation on the correctly arranged subsequent output symbol string of the channel equalizer of the data 2 part to determine the transmission data.

The packet may be sampled N (N is a natural number) times for every symbol.

A method for equalizing a channel and determining reception data of a packet communication receiver according to an exemplary embodiment of the present disclosure includes receiving a reception sample string of a packet having a midamble and location information of the midamble; dividing the reception sample string into a first sub sample string and a second sub string stream using the location information of the midamble; and performing channel equalization on the first sub sample string and the second sub sample string, respectively, using a channel equalizing algorithm of the channel equalizer.

The dividing may include: dividing the reception sample string so as to superimpose the midamble.

In the first sub sample string, a symbol string may be arranged in the order of data 1 and the midamble, and in the second sub sample string, a symbol string is arranged in the order to the midamble and data 2.

The performing of channel equalization may include: rearranging the order of the first sub sample string in a reverse order to change the arrangement of the symbol string in the order of a reversely arranged midamble and reversely arranged data 1; training a filter coefficient of the channel equalizer using the reversely arranged reference midamble symbol string as a training signal; and performing the channel equalization on the reversely arranged first sub sample string through the filter coefficient using the reversely arranged first sub sample string as an input reception signal of the channel equalizing algorithm of the channel equalizer.

The performing of channel equalization may include: defining a midamble binary data string as a first symbol $S(0)=(1+j*0)$, defining a symbol string generated in accordance with a symbol mapping method of π/4-DQPSK modulation as a reference midamble symbol string, defining the generated reference midamble symbol string which is rearranged in a reverse order as a reversely arranged reference midamble symbol string, and using the reference midamble symbol string or the reversely arranged reference midamble symbol string as a training signal of the channel equalizer.

The performing of channel equalization may include: training the filter coefficient of the channel equalizer using the correctly arranged reference midamble symbol string as a training signal; and performing the channel equalization on the second sub sample string through the filter coefficient using the second sub sample string as an input reception signal of a channel equalizing algorithm of the channel equalizer.

The performing of channel equalization may include: considering that the first sub sample string is virtually rearranged in a reverse order; training a filter coefficient of the channel equalizer using the reversely arranged reference midamble symbol string as a training signal; and performing the channel equalization on the virtually reversely arranged first sub sample string through the filter coefficient using the first sub sample string as an input reception signal of the channel equalizing algorithm of the channel equalizer.

The method for equalizing a channel and determining reception data of a packet communication receiver according to an exemplary embodiment of the present disclosure may further include determining a symbol which is the closest to an output symbol of the channel equalizer in a corresponding symbol section among four candidate symbols of a constellation set of a π/4 DQPSK signal, as a reception symbol in the corresponding symbol section, after the symbol section of the training signal, to use the determined symbol as a training signal.

The method for equalizing a channel and determining reception data of a packet communication receiver according to an exemplary embodiment of the present disclosure may further include determining the reception symbol, based on signs of a real part and an imaginary part of an output signal of a filter of the channel equalizer, for a symbol section having one constellation of the constellation set of the π/4 DQPSK signal; and determining the reception symbol based on a comparison result of absolute values of the real part and the imaginary part of the output signal of the filter of the channel equalizer, for the symbol section having another constellation of the constellation set.

The method for equalizing a channel and determining reception data of a packet communication receiver according to an exemplary embodiment of the present disclosure may further include using a last symbol of the reversely arranged midamble of the output symbol string of the channel equalizer by the reversely arranged first sub sample string as a reference symbol of differential demodulation for determining a transmission symbol in the data 1 part; and performing differential demodulation on the reversely arranged subsequent output symbol string of the channel equalizer of the data 1 part to determine transmission data.

The method for equalizing a channel and determining reception data of a packet communication receiver according to an exemplary embodiment of the present disclosure may further include: using a symbol corresponding to the last symbol of the reference midamble of the output symbol string of the channel equalizer by the second sub sample string to a symbol by binary data of data 2 as a reference symbol of differential demodulation for determining a transmission symbol, in the data 2 part; and sequentially performing differential demodulation on the correctly arranged subsequent output symbol string of the channel equalizer of the data 2 part to determine the transmission data.

Specific items of other embodiments are included in the detailed description and the drawings.

Advantages and characteristics of the present invention and/or a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims. Like reference numerals indicate like elements throughout the specification.

Hereinafter, exemplary embodiments of the present disclosure will be described in detail with reference to the accompanying drawings.

FIG. 1 is a block diagram illustrating an apparatus for equalizing a channel and determining reception data of a packet communication receiver according to an exemplary embodiment of the present disclosure.

Referring to FIG. 1, an apparatus 100 for equalizing a channel and determining reception data of a packet communication receiver according to an exemplary embodiment of the present disclosure includes an input interface unit 110, a sample dividing unit 120, a channel equalizing unit 130, a reception data determining unit 140, and a control unit 150.

The input interface unit 110 receives a reception sample string of a packet having a midamble and location information of the midamble. Here, as the packet, a packet which is sampled N (N is a natural number) times for every symbol may be used.

The sample dividing unit 120 divides the reception sample string into a first sub sample string and a second sub sample string using the location information of the midamble. In this case, when the reception sample string is divided, the sample dividing unit 120 may divide the reception sample string so as to superimpose the midamble.

Therefore, the first sub sample string is arranged in the order of data 1 and the midamble and the second sub sample string is arranged in the order of the midamble and data 2.

The channel equalizing unit 130 may perform channel equalization on the first and second sub sample strings, respectively, using a channel equalizing algorithm of the channel equalizer. Here, the channel equalizer is implemented as an adaptive channel equalizer. As the channel equalizing algorithm, any one of a minimum mean square (LMS) algorithm, a recursive least square (RLS) algorithm, and a variable step-size (VSS) algorithm may be selectively used.

Hereinafter, the channel equalizing unit 130 will be described in detail.

The channel equalizing unit 130 rearranges the order of the first sub sample string in a reverse order to change the arrangement of the symbol string in the order of a reversely arranged midamble and reversely arranged data 1. The channel equalizing unit 130 trains a filter coefficient of the channel equalizer using the reversely arranged reference midamble symbol string as a training signal. The channel equalizing unit 130 performs the channel equalization on the reversely arranged first sub sample string through the filter coefficient using the reversely arranged first sub sample string as an input reception signal of the channel equalizing algorithm of the channel equalizer.

Figure 8:
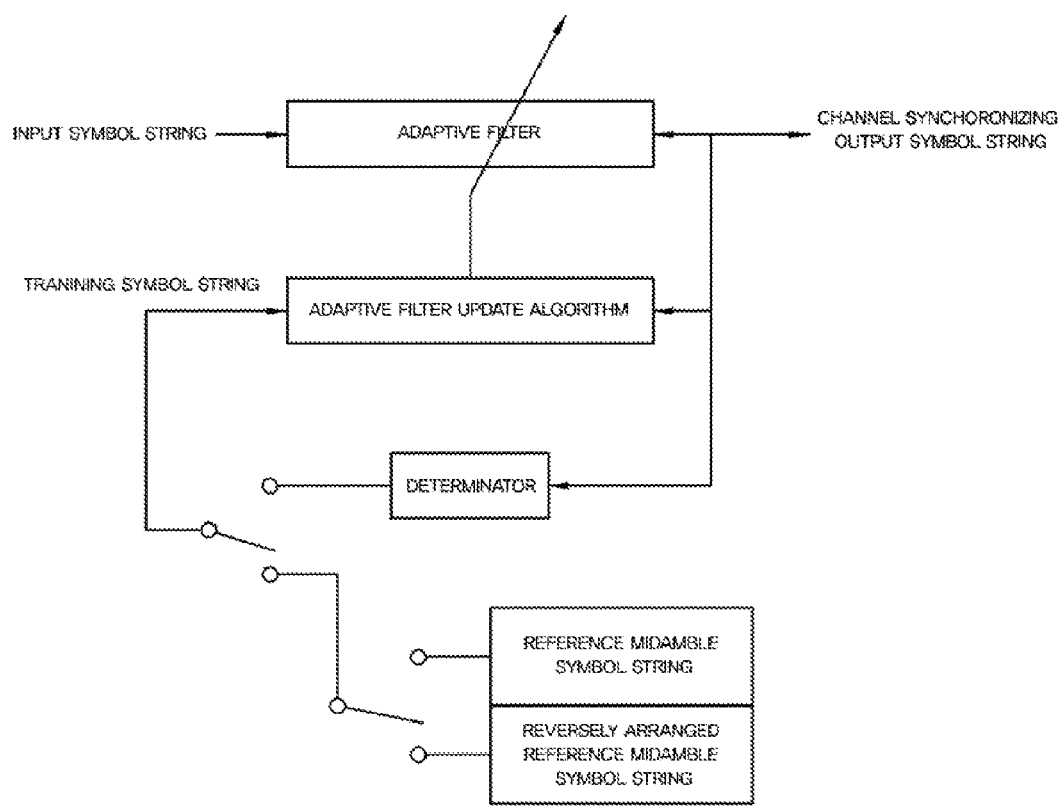
FIG. 8 is a view illustrating a structure of a channel equalizer which is applied to an exemplary embodiment of the present disclosure.

That is, the channel equalizing unit 130 inputs a midamble (a reversely arranged reference midamble) of the first sub sample string to an adaptive filter update algorithm (see FIG. 8) as a training symbol string to train a filter coefficient of the channel equalizer. Further, the channel equalizing unit 130 uses the reversely arranged first sub sample string as an input reception signal of the channel equalizer to perform channel equalization on the reversely arranged first sub sample string. By doing this, the channel equalizer adapts the filter coefficient by repeating the training to compensate the distortion of the data 1.

Further, the channel equalizing unit 130 trains the filter coefficient of the channel equalizer using the correctly arranged reference midamble symbol string as a training signal. The channel equalizing unit 130 performs the channel equalization on the second sub sample string through the filter coefficient using the second sub sample string as an input reception signal of the channel equalizing algorithm of the channel equalizer.

That is, the channel equalizing unit 130 inputs a midamble (a correctly arranged reference midamble) of the second sub sample string to the adaptive filter update algorithm (see FIG. 8) as a training symbol string to train the filter coefficient of the channel equalizer. Further, the channel equalizing unit 130 uses the correctly arranged first sub sample string as an input reception signal of the channel equalizer to perform channel equalization on the correctly arranged second sub sample string. By doing this, the channel equalizer adapts the filter coefficient by repeating the training to compensate the distortion of the data 2.

As another exemplary embodiment regarding channel equalization of the first sub sample string, the channel equalizing unit 130 may consider that the first sub sample string is virtually reversely rearranged. The channel equalizing unit 130 trains the filter coefficient of the channel equalizer using the reversely arranged reference midamble as a training signal. The channel equalizing unit 130 performs the channel equalization on the virtually reversely arranged first sub sample string through the filter coefficient using the first sub sample string as an input reception signal of the channel equalizing algorithm of the channel equalizer.

When the filter coefficient of the channel equalizer is trained, according to the exemplary embodiment of the present invention, not only the midamble but also the reception symbol may be used as the training signal to perform the channel equalization. The channel equalization apparatus 100 of a packet communication receiver according to an exemplary embodiment of the present disclosure may further include a determining unit (a configuration corresponding to a determinator of FIG. 8) to determine the reception symbol to be used as the training signal.

Figure 6:
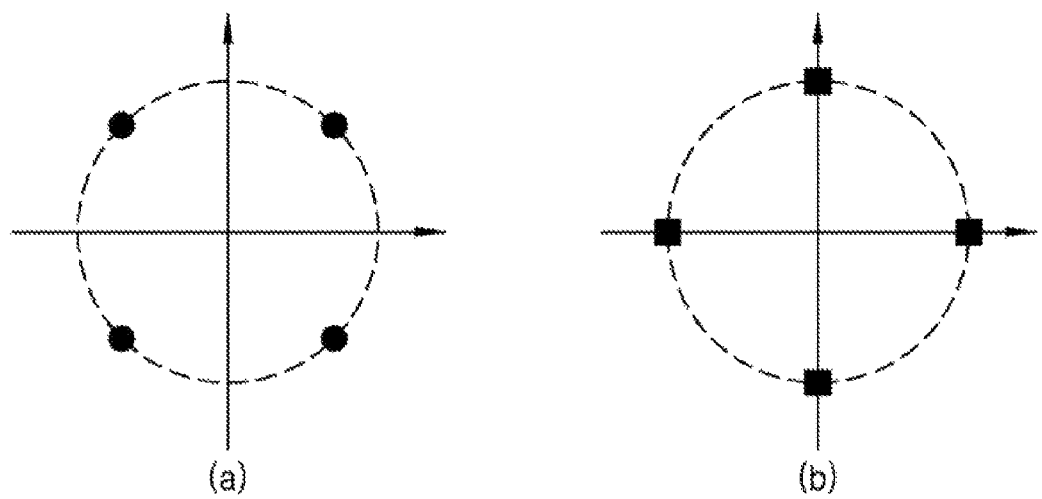
FIG. 6 is a view illustrating constellation of a $\pi/4$ DQPSK signal.

After the symbol section of the training signal, the determining unit may determine a symbol which is the closest to an output symbol of the channel equalizer in a corresponding symbol section among four candidate symbols of a constellation set (see FIG. 6) of a π/4 DQPSK signal as a reception symbol in the corresponding symbol section. Therefore, the determined symbol may be used as a training signal.

Further, the determining unit determines the reception symbol, based on signs of a real part and an imaginary part of an output signal of a filter of the channel equalizer, for a symbol section having one constellation of the constellation set of the π/4 DQPSK signal. The determining unit may determine the reception symbol based on a comparison result of absolute values of the real part and the imaginary part of the output signal of the filter of the channel equalizer, for the symbol section having another constellation of the constellation set.

The reception data determining unit 140 may use the last symbol of the reversely arranged midamble of the output symbol string of the channel equalizer by the reversely arranged first sub sample string as a reference symbol of differential demodulation for determining a transmission symbol in the data 1 part. The reception data determining unit 140 may sequentially perform differential demodulation on the reversely arranged subsequent output symbol string of the channel equalizer of the data 1 part to determine transmission data.

Further, the reception data determining unit 140 may use a symbol corresponding to the last symbol of the reference midamble of the output symbol string of the channel equalizer by the second sub sample string to a symbol by binary data of data 2 as a reference symbol for differential demodulation for determining a transmission symbol, in the data 2 part. The reception data determining unit 140 may sequentially perform differential demodulation on the correctly arranged subsequent output symbol string of the channel equalizer of the data 2 part to determine transmission data.

The control unit 150 entirely controls the apparatus 100 for equalizing a channel and determining reception data of a packet communication receiver according to an exemplary embodiment of the present disclosure, that is, operations of the input interface unit 110, the sample dividing unit 120, the channel equalizing unit 130, the reception data determining unit 140, and the like.

Figure 2:
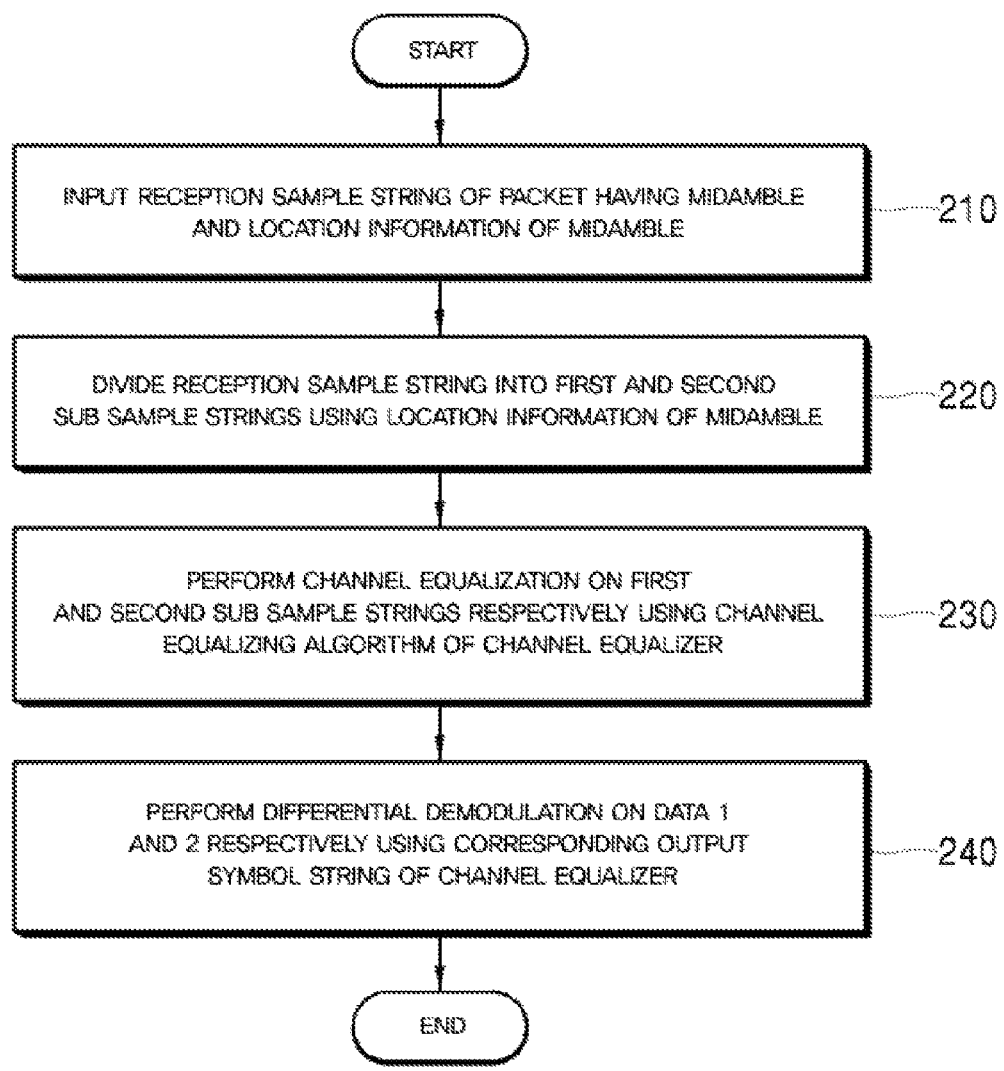
FIG. 2 is a flowchart illustrating a method for equalizing a channel and determining reception data of a packet communication receiver according to an exemplary embodiment of the present disclosure.

FIG. 2 is a flowchart illustrating a method for equalizing a channel and determining reception data of a packet communication receiver according to an exemplary embodiment of the present disclosure.

Referring to FIG. 2, in step 210, the packet communication receiver receives a reception sample string of a packet having a midamble and location information of the midamble.

Next, in step 220, the packet communication receiver divides the reception sample string into a first sub sample string and a second sub sample string using the location information of the midamble. In this case, when the reception sample string is divided, the packet communication receiver may divide the reception sample string so as to superimpose the midamble.

Next, in step 230, the packet communication receiver performs channel equalization on each of the first and second sub sample strings using a channel equalizing algorithm of a channel equalizer.

Next, in step 240, the packet communication receiver performs differential demodulation on data 1 and 2 of the first and second sub sample strings using the corresponding output symbol string of the channel equalizer to determine reception data for the data 1 and 2.

That is, the packet communication receiver uses a last symbol of the reversely arranged midamble of the output symbol string of the channel equalizer by the reversely arranged first sub sample string as a reference symbol of differential demodulation for determining a transmission symbol in the data 1 part. The packet communication receiver sequentially performs differential demodulation on the reversely arranged subsequent output symbol string of the channel equalizer of the data 1 part to determine transmission data.

Further, the packet communication receiver uses a symbol corresponding to the last symbol of the reference midamble of the output symbol string of the channel equalizer by the second sub sample string to a symbol by binary data of data 2 as a reference symbol of differential demodulation for determining a transmission symbol, in the data 2 part. The packet communication receiver sequentially performs differential demodulation on the correctly arranged subsequent output symbol string of the channel equalizer of the data 2 part to determine the transmission data.

Figure 3:
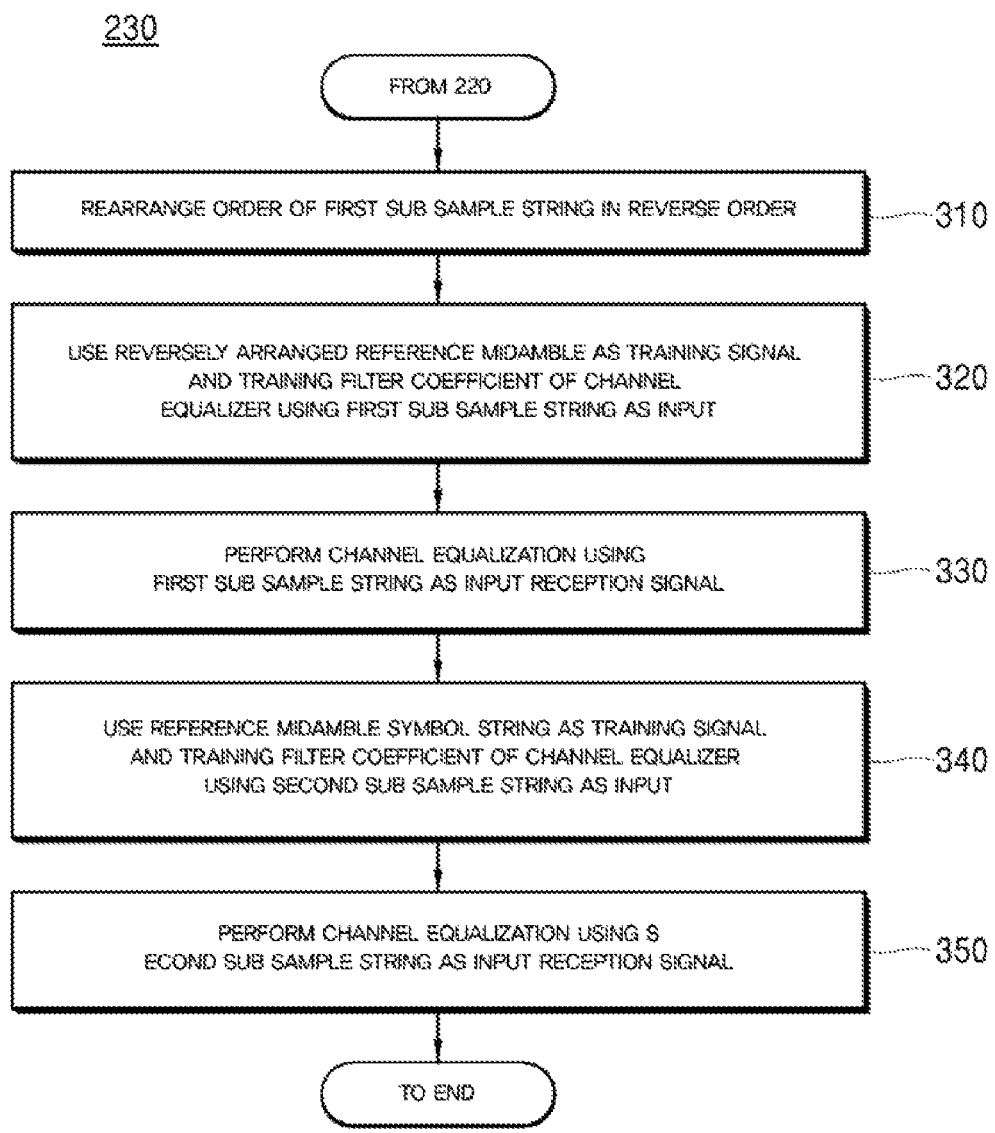
FIG. 3 is a flowchart illustrating a process of performing channel equalization and reception data determination according to an exemplary embodiment of the present disclosure in detail.

FIG. 3 is a flowchart illustrating to describe a process of performing channel equalization according to an exemplary embodiment of the present disclosure in detail.

Referring to FIG. 3, in step 310, the packet communication receiver reversely rearranges the order of the first sub sample string to change each of a symbol string arrangement to be in the order of the reversely arranged midamble and the reversely arranged data 1.

Next, in step 320, the packet communication receiver uses the reversely arranged reference midamble symbol string as a training signal and trains the filter coefficient of the channel equalizer using the first sub sample string as an input.

Next, in step 330, the packet communication receiver performs channel equalization using the first sub sample string as an input reception signal.

Next, in step 340, the packet communication receiver uses the reference midamble symbol string as a training signal and trains the filter coefficient of the channel equalizer using the second sub sample string as an input.

Figure 4:
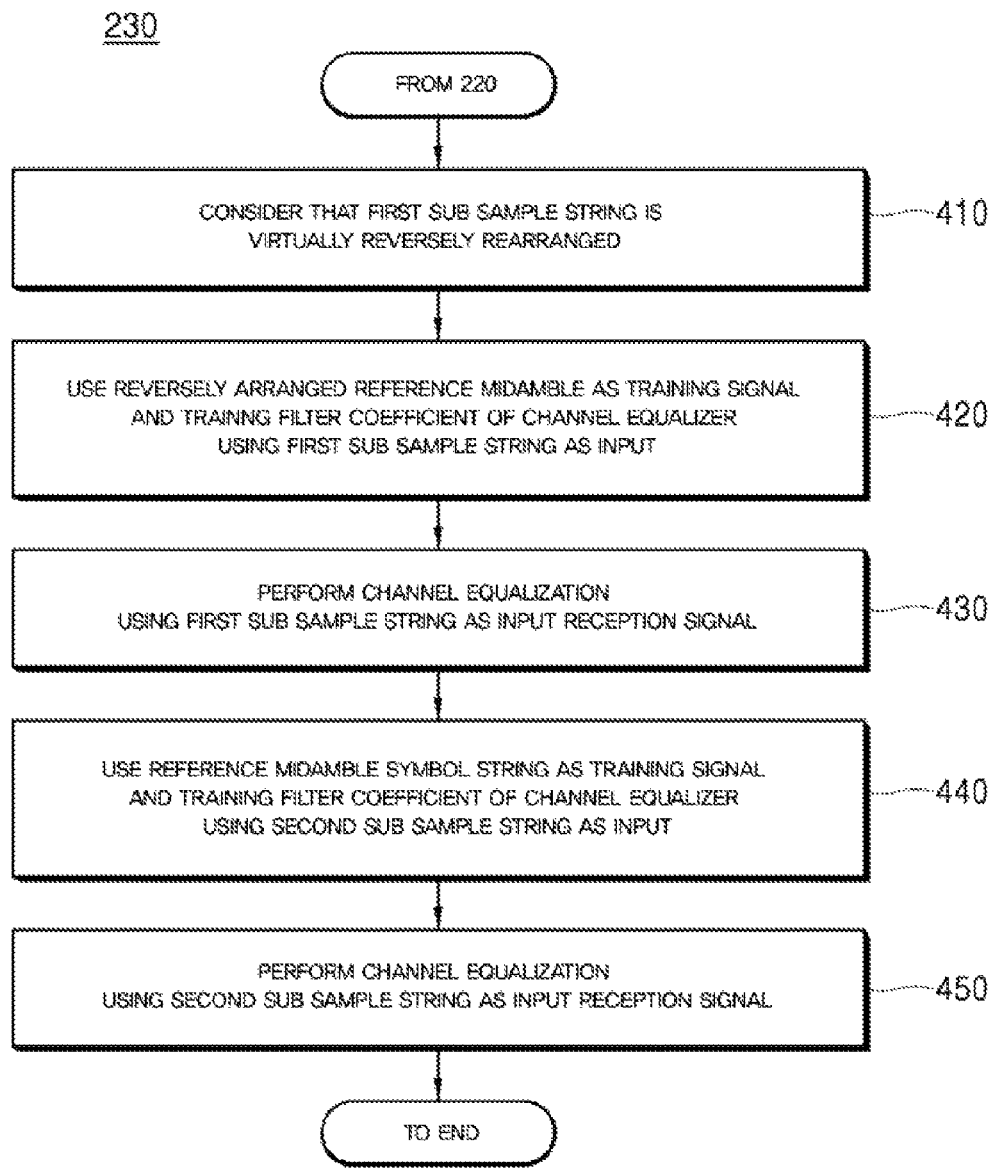
FIG. 4 is a flowchart illustrating a process of performing channel equalization and reception data determination according to another exemplary embodiment of the present disclosure in detail.

FIG. 4 is a flowchart illustrating to describe a process of performing channel equalization according to another exemplary embodiment of the present disclosure in detail.

Referring to FIG. 4, in step 410, the packet communication receiver considers that the first sub sample string is virtually reversely rearranged.

Next, in step 420, the packet communication receiver uses a reversely arranged reference midamble as a training signal and trains a filter coefficient of a channel equalizer using a first sub sample string as an input.

Next, in step 430, the packet communication receiver performs channel equalization using the first sub sample string as an input reception signal.

Next, in step 440, the packet communication receiver uses the reference midamble symbol string as a training signal and trains the filter coefficient of the channel equalizer using the second sub sample string as an input.

Hereinafter, exemplary embodiments of the present invention will be described in more detail with reference to FIGS. 5 to 9.

In digital data communication, packet data communication which divides data having a long length into data having a predetermined length, adds information required to exchange data to the divided data to create data having a packet as a unit and transmits the packet is widely used.

The packet is transmitted through a physical channel and the packet symbol string which is transmitted through the physical channel is generally divided into a symbol string which is known to a transmitter/receiver and a packet data symbol string. As the known symbol string, a receiver sends a predetermined symbol string to utilize the symbol string to extract synchronization information and compensate channel distortion in order to receive correct data. As the packet data symbol string, a transmitter maps data to be transmitted as a transmission symbol to transmit the data.

Figure 5:
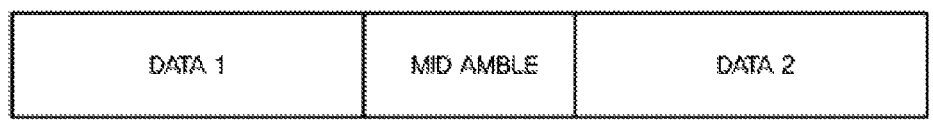
FIG. 5 is a view illustrating a packet structure using a midamble.

A packet structure considered in the present exemplary embodiment has a structure in which the known symbol string is located in the middle of a packet, as illustrated in FIG. 5. The known symbol string in the middle of the packet is referred to as a midamble. Transmission data in the packet which is transmitted prior to the midamble is referred to as data 1 and transmission data which is transmitted after the midamble is referred to as data 2. The data of the packet is transmitted using π/4-DQPSK (differential quadrature phase shift keying) modulation.

The π/4-DQPSK modulation method transmits signals which are shifted by a phase proportional to a phase difference corresponding to input data while alternately using two QPSK signal sets which are twisted from each other at 45°. That is, according to this modulation method, in an odd-numbered symbol section, one symbol among QPSK signal sets illustrated in FIG. 6A is transmitted. Further, in an even-numbered symbol section, one symbol among QPSK signal sets which are twisted at 45° illustrated in FIG. 6B is transmitted. Differential signals are mapped to a k-th symbol and a (k+1)-th symbol as represented in Equation 1.

$$s(n)=s(n-1)\exp(j\theta(n)) \quad \text{[Equation 1]}$$

Here, an initial reference value $s(0)=1$, $$\theta(n) \in \left\{\frac{\pi}{4}, \frac{3\pi}{4}, -\frac{3\pi}{4}, -\frac{\pi}{4}\right\}$$

and, Table 1 is determined by combination of input data bits. A first ((2k−1)-th) bit of two input data bits is used as Q-ch data and a second (2k-th) bit is used as I-ch data. Input data which is converted into a symbol is band-restricted by using a pulse shaping filter and then modulated into a carrier band to be transmitted in the unit of packet having a predetermined length.

TABLE 1

| Q-ch data (2k − 1) | I-ch data (2k) | θ(n) |
|---|---|---|
| 1 | 1 | −3π/4 |
| 0 | 1 | 3π/4 |
| 0 | 0 | π/4 |
| 1 | 0 | −π/4 |

Table 1 Phase mapping of k-th transmission signal in accordance with input binary data The receiver mixes the reception signal and a local oscillator output corresponding to a carrier frequency and then converts the mixed signal into a base band signal through low pass filtering, detects and compensates a synchronization signal. Further, the receiver improves a quality of the reception signal via the channel equalizer and then determines the transmission signal.

The receiver which is considered in the present disclosure is assumed to detect a packet using a midamble of the packet and ideally detect the packet. Further, for the purpose of easy description and understanding of the present disclosure, it is assumed that an input signal of the channel equalizer is a sample string which is obtained by sampling the reception signal one time for every symbol.

However, the description of the present disclosure may be applied in the same manner even when a sample string obtained by excessively sampling the signal N times for every symbol is used as an input of the channel equalizer. However, an operation of the adaptive filter algorithm for updating the filter coefficient of the channel equalizer is performed in the unit of symbol. Therefore, when the adaptive filter algorithm is operated, the input sample needs to be moved in the unit of N samples therefor. Further, even though the π/4 DQPSK modulating method has been described, the exemplary embodiment may be used in a receiver for transmission which uses a midamble packet structure and a differential modulating method by the same manner.

Figure 7:
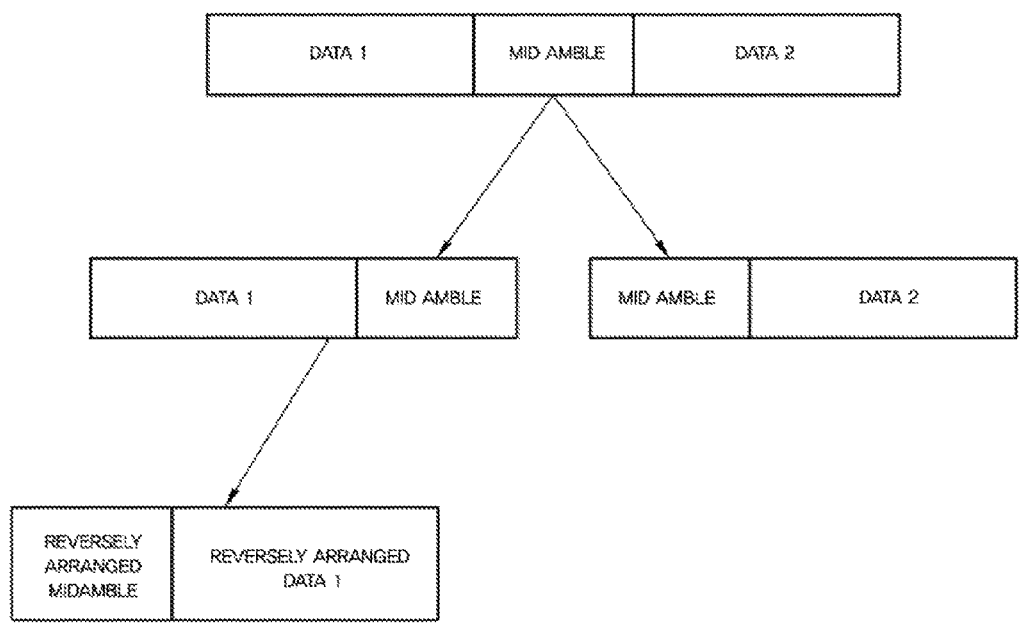
FIG. 7 is a view illustrating a method for dividing a reception sample string according to an exemplary embodiment of the present disclosure.

The channel equalizer receives a reception sample string corresponding to one packet which is sampled N times for every symbol and the location information (for example, midamble starting sample index) of the midamble as inputs. Further, the channel equalizer divides the reception sample string of the packet having a midamble to be input into two sub sample strings as illustrated in FIG. 7 using the location information of the midamble, to superimpose the midamble. The first sub sample string is configured by a sample string corresponding to data 1 and the midamble and the second sub sample string is configured by a sample string corresponding to the midamble and data 2.

When the sub sample string is configured as described above, the second sub sample string is the same as the packet structure having a generally widely used preamble. The first sub sample string is configured such that a known symbol string is located at the last part of the packet.

After dividing the sample string into two sub sample strings as described above, the channel equalizing algorithm is applied to each of the sub sample strings to perform channel equalization. In this case, the known midamble signal is used as a training signal of the channel equalizer.

The exemplary embodiment of the present disclosure uses a differential modulating method, so that even though the binary data of the midamble is equal, a starting symbol by a midamble binary data varies for every packet by the binary data of data 1. However, a phase difference between symbols of the midamble symbol string is equal for all packets.

That is, it is assumed that an initial signal for every packet is (1+j0) and a symbol string in which the generated symbol string of the midamble is phase-rotated with the same size is transmitted for every packet. Further, according to the differential modulating method, transmission information is determined by a phase difference between an immediately before reception symbol and a current reception symbol. Therefore, even though arbitrary phase shifting is generated, the phase shifting does not affect to determine the transmission information. According to the exemplary embodiment of the present disclosure, the channel equalization and the transmission signal determination are performed using the above characteristic.

First, in order to perform channel equalization for a first sub sample string, an order of the sub sample string is reversely rearranged. In actual implementation, the sub sample string may be actually reversely rearranged. It is assumed that the sub sample string is virtually reversely rearranged while leaving the sub sample string as it is, to implement the channel equalizer. In this specification, for the convenience of description and further understanding, it is described that the sub sample string is reversely rearranged.

When it is assumed that a midamble symbol of a reception packet is formed by k symbols (M(1) to M(k) symbols), if a first sub sample string is reversely rearranged, the rearranged sample string has a form of a data packet having a preamble. The sub sample string which is reversely rearranged as described above is used as an input reception signal of a channel equalizing algorithm. In this case, as a training signal, a reference midamble symbol string which is reversely arranged is used. The reference midamble symbol string is defined as a midamble symbol string which is generated under assumption that a first signal (a zero-th assumption symbol) is (1+j0) at the time of differential modulation of binary data of the midamble.

When channel equalization is performed on a second sub sample string, the second sub sample string is used as an input reception signal of the channel equalizing algorithm. In this case, as a training signal, a reference midamble symbol string is used. In each channel equalizing algorithm, an operation result symbol string corresponding to one sample for every symbol is generated. As an adaptive equalizing algorithm which is used in the channel equalizer, any one of various algorithms such as an LMS algorithm or a RLS algorithm may be selectively used.

In the meantime, a decision feedback equalizer (DFE) performs channel equalization using not only a known training signal, but also a transmission symbol which is determined using a channel equalizing result of a data part as a training signal for subsequent channel equalization. In the case of DFE, when a transmission symbol of a data part is determined in the channel equalizer, the transmission signal is determined by calculating a phase difference between a previous channel equalization symbol and a current channel equalization symbol. Further, differential modulation is performed thereon to determine a symbol which will be used as a training signal. In order to simplify a process of obtaining a symbol which is used as a new training signal, an exemplary embodiment of the present invention uses the following method. The method will be described with reference to FIG. 8 below.

Since a training symbol string (a reversely arranged reference midamble symbol string or a reference midamble symbol string) which is input to the channel equalizer is already known, the known training symbol is set as a desired signal of the adaptive channel equalizer to train a coefficient of the adaptive channel equalizer filter during the length of the known training symbol string. After the training symbol section, as a symbol to be determined in the corresponding symbol section, a symbol which is the closest to the output symbol of the channel equalizer during the corresponding symbol section among four candidate symbols of a constellation set (four available symbols of FIG. 6A or 6B) for π/4 DQPSK signal is set as a transmission signal in the corresponding symbol section and used as a training signal of the adaptive channel equalizer. When one symbol of four candidate symbols in the constellation of FIG. 6A is determined as a transmission symbol in a K-th symbol section, one of four sign symbols in the constellation of FIG. 6B is determined as a transmission symbol in a (K+1)-th symbol section.

A transmission signal in a section having a constellation of FIG. 6A is determined by one of four symbols from signs of a real part and an imaginary part of the output signal of the channel equalizer filter as represented by Equation 2.

$$d(k)=[\text{sign}(\text{Real}(y_{out}(k)))+j*\text{sign}(\text{Imag}(y_{out}(k)))]/\sqrt{(2)} \quad [\text{Equation 2}]$$

Here, y_out(k) is an output value of a channel equalizer in a k-th symbol section, Real{x} is a real part of x, Imag{x} is an imaginary part of x, sign(y) is a function which outputs +1 when the real number y has a positive value and outputs −1 when the real number y has a negative value.

The transmission signal is determined by Equation 3 in a section having a constellation of FIG. 6B.

$$d(k) = \begin{cases} \text{sign}(\text{Real}(y_{out}(k))), & \text{for } |\text{Real}(y_{out}(k))| > |\text{Imag}(y_{out}(k))| \\ j*\text{sign}(\text{Imag}(y_{out}(k))), & \text{for } |\text{Real}(y_{out}(k))| \leq |\text{Imag}(y_{out}(k))| \end{cases} \quad [\text{Equation 3}]$$

The output symbol string of the adaptive channel equalizer for the first sub sample string is arranged in a reverse order of time so that the output symbol is reversely rearranged to be arranged in accordance with the order of time. The output symbol string of the channel equalizer which is rearranged in accordance with the order of time is differentially demodulated to determine the transmission signal.

In this case, in order to determine a k-th transmission symbol by the differential demodulation/modulation, a (k−1)-th reception symbol and a k-th reception symbol need to be used. Therefore, a length of the output symbol string of the channel equalizer for the first sub sample string is required as long as a symbol length obtained by a length of a reversely arranged midamble symbol and a symbol length of data 1.

When the output of the channel equalizer is rearranged again, the last symbol becomes the first symbol, which is used as a reference symbol of differential demodulation. Therefore, during the packet transmission, prior to the data 1, additional symbol which provides a reference symbol needs to be further transmitted. In order to avoid the additional symbol transmission, according to an exemplary embodiment of the present invention, the transmission symbol is determined by directly using a reversely arranged output symbol string of the channel equalizer.

First, in order to determine the transmission data, the last symbol (the first symbol of the reference midamble symbol string) of the reversely arranged midamble of the reversely arranged output symbol of the channel equalizer is used as a reference symbol for differential demodulation to determine a transmission symbol. Further, the rearranged subsequent output symbol string of the channel equalizer of the data 1 part is sequentially differentially demodulated to determine transmission data. When the above method is used, a first symbol which is additionally required to perform the differential demodulation using a correctly arranged output symbol string of the channel equalizer is not necessary.

A differential demodulating method which determines a transmission symbol using a reversely arranged symbol signal is as follows: When a reversely arranged k-th input symbol of the transmission symbol determinator is denoted by $r_1(k)$ and $r_1(0)$ is assumed as an output symbol of the channel equalizer corresponding to the last symbol of the reversely arranged midamble, an output of the differential demodulator to determine the transmission symbol may be represented by the following Equation 4.

$$Z_R(k)=r^*_1(k-1)\cdot r_1(k)\cdot k=1,2,\ldots,L_1 \quad [\text{Equation 4}]$$

Figure 9:
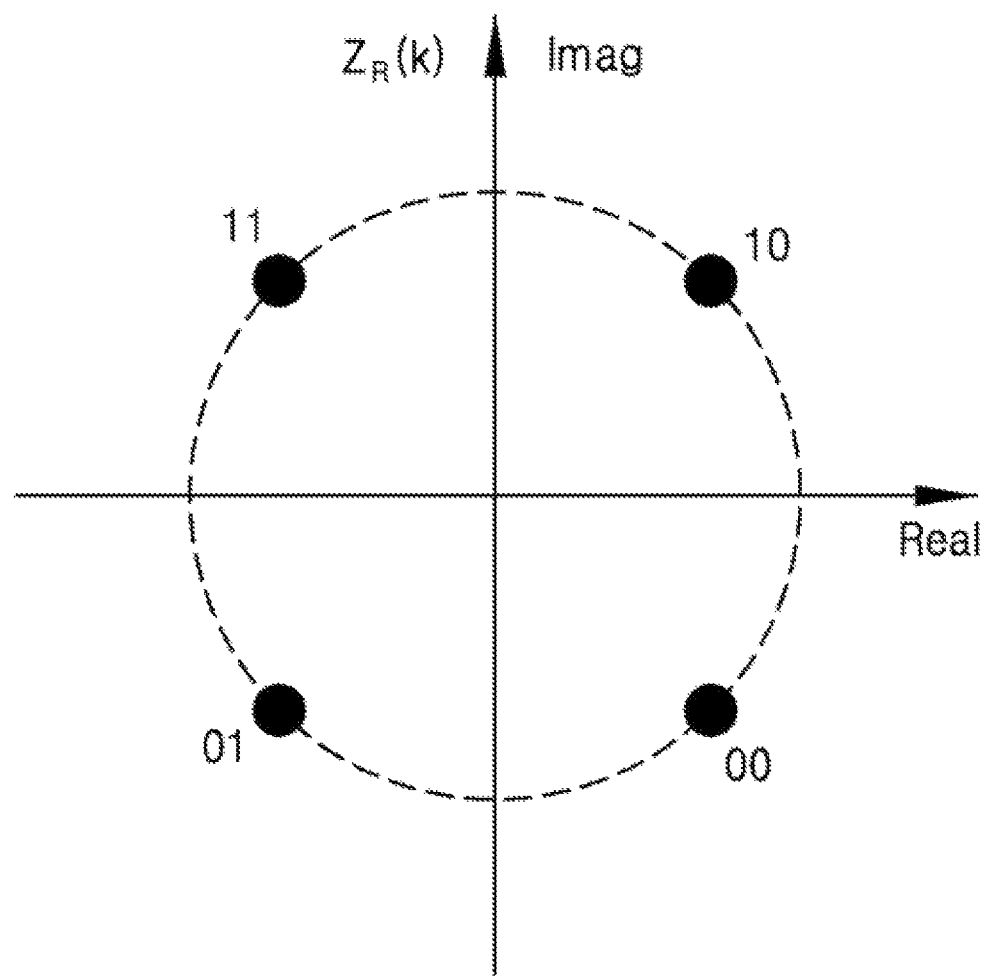
FIG. 9 is a view illustrating an ideal constellation of $Z_R(k)$ in a $\pi/4$ DQPSK signal which is reversely arranged according to an exemplary embodiment of the present disclosure and a determination signal in accordance with the constellation.

When it is assumed that $r_1(k)$ is ideal, $Z_R(k)$ has a constellation as illustrated in FIG. 9 and has a binary transmission signal in accordance with each constellation. The constellation of FIG. 9 and a transmission signal determined at that time may be determined by Equations 5 and 6 in accordance with $Z_R(k)$.

$$B_{1R}(2k-1) = \begin{cases} 1, & \text{if Real } (Z_R(k)) < 0 \\ 0, & \text{if Real } (Z_R(k)) \geq 0 \end{cases} \quad [\text{Equation 5}]$$

$$B_{1R}(2k) = \begin{cases} 1, & \text{if Imag } (Z_R(k)) \geq 0 \\ 0, & \text{if Imag } (Z_R(k)) < 0 \end{cases} \quad [\text{Equation 6}]$$

According to an exemplary embodiment of the present disclosure, an ideal constellation of $Z_R(k)$ in a π/4 DQPSK signal which is reversely arranged and a determined signal in accordance with the constellation can be illustrated differently from FIG. 9. A transmission binary data string $[B_2(k); k=1, 2, \ldots, 2L_2]$ of data 2 is determined using Equations 5 and 6.

The exemplary embodiment of the present disclosure uses the method as described above so that the channel equalization may be performed even in packet communication having a midamble, using a channel equalizer having a preamble of the related art. Even though the binary data of the midamble is equal due to the characteristic of the π/4-DQPSK modulating method, as a midamble symbol string, a symbol string in which a reference midamble symbol string is phase-shifted is transmitted for every packet. Even in this case, the receiver performs channel equalization and differential demodulation using the reference midamble symbol string.

According to an exemplary embodiment of the present disclosure, when channel equalization is performed using a symbol corresponding to a random data part of a packet in a channel equalizer, a transmission symbol is determined with respect to a π/4-DQPSK constellation by separating an odd-numbered symbol and an even-numbered symbol, rather than 8-PSK constellation including all transmittable symbols. Therefore, the channel equalizer has robustness in determining a transmission symbol. Further, the channel equalizer does not determine a transmission symbol through the processes of differential demodulation and differential modulation, but determines one of available signal sets in the corresponding symbol section, thereby reducing a complexity of an operation.

Exemplary embodiments of the present disclosure include a computer readable medium which includes a program command to perform an operation implemented by various computers. The computer readable medium may include solely a program command, a local data file, and a local data structure or a combination thereof. The medium may be specifically designed or constructed for the present invention or known to those skilled in the art of computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter.

Although specific exemplary embodiment of the present invention has been described, it should be understood that various modification may be allowed without departing from the scope of the present invention. Therefore, the scope of the present invention should not be defined by being limited to the embodiments described, but should be defined by the claims to be described below and those equivalent to the claims.

As described above, although the present invention has been described by limited embodiments and drawings, the present invention is not limited to the embodiments, and it will be apparent to those skilled in the art to which the present invention pertains that various modifications and variations may be made from the description. Therefore, the spirit of the present invention needs to be interpreted by the appended claims and all equivalent modifications are included within the spirit of the present invention.

REFERENCE NUMERALS

110: input interface unit
120: sample diving unit
130: channel equalizing unit
140: reception data determining unit
150: control unit

What is claimed is:

1. A method for equalizing a channel and determining reception data of a packet communication receiver, the method comprising:
    receiving a reception sample string of a packet having a midamble and location information of the midamble;
    dividing the reception sample string into a first sub sample string and a second sub sample string using the location information of the midamble; and
    performing channel equalization on the first sub sample string and the second sub sample string, respectively, using a channel equalizing algorithm of a channel equalizer,
    wherein in the first sub sample string, a first symbol string is arranged in a first order of data 1 and the midamble and in the second sub sample string, a second symbol string is arranged in a second order of the midamble and data 2,
    wherein the performing of the channel equalization includes:
    rearranging the first order of the first sub sample string in reverse order to change arrangement of the first symbol string in a third order of a reversely arranged midamble and reversely arranged data 1;
    training a filter coefficient of the channel equalizer using a reversely arranged reference midamble symbol string as a training signal; and
    performing the channel equalization on the first sub sample string reversely arranged through the filter coefficient using the first sub sample string reversely arranged as an input reception signal of the channel equalizing algorithm of the channel equalizer.

2. The method according to claim 1, wherein the dividing includes: dividing the reception sample string so as to superimpose the midamble.

3. The method according to claim 1, wherein the performing of the channel equalization includes:
    defining a midamble binary data string as a first symbol $S(0)=(1+j*0)$, defining a symbol string generated in accordance with a symbol mapping method of $\pi/4$-DQPSK modulation as a reference midamble symbol string, defining the reference midamble symbol string which is rearranged in reverse order as the reversely arranged reference midamble symbol string, and using the reference midamble symbol string or the reversely arranged reference midamble symbol string as the training signal of the channel equalizer, wherein the j is imaginary unit.

4. The method according to claim 1, wherein the performing of the channel equalization includes:
    training the filter coefficient of the channel equalizer using the reference midamble symbol string which is correctly arranged as the training signal; and
    performing the channel equalization on the second sub sample string through the filter coefficient using the second sub sample string as the input reception signal of the channel equalizing algorithm of the channel equalizer.

5. The method according to claim 1, wherein the performing of the channel equalization includes:
    considering that the first sub sample string is virtually rearranged in reverse order;
    training the filter coefficient of the channel equalizer using the reversely arranged reference midamble symbol string as the training signal; and
    performing the channel equalization on the first sub sample string which is virtually reversely arranged through the filter coefficient using the first sub sample string as the input reception signal of the channel equalizing algorithm of the channel equalizer.

6. The method according to claim 5, further comprising:
    determining a symbol which is the closest to an output symbol of the channel equalizer in a corresponding symbol section among four candidate symbols of a constellation set of a $\pi/4$ DQPSK signal, as a reception symbol in the corresponding symbol section, after the symbol section of the training signal, to use the determined symbol as the training signal.

7. The method according to claim 5, further comprising:
    determining a reception symbol, based on signs of a real part and an imaginary part of an output signal of a filter of the channel equalizer, for a symbol section having one constellation of a constellation set of the $\pi/4$ DQPSK signal; and
    determining the reception symbol based on a comparison result of absolute values of the real part and the imaginary part of the output signal of the filter of the channel equalizer, for the symbol section having another constellation of the constellation set.

8. The method according to claim 1, further comprising:
    using a last symbol of a reversely arranged midamble of an output symbol string of the channel equalizer by the first sub sample string which is reversely arranged as a reference symbol of differential demodulation for determining a transmission symbol in data 1 part; and
    performing differential demodulation on a reversely arranged subsequent output symbol string of the channel equalizer of the data 1 part to determine transmission data.

9. The method according to claim 1, further comprising:
    using a last symbol of a reference midamble of an output symbol string of the channel equalizer by the second sub sample string to a symbol by binary data of data 2 as a reference symbol of differential demodulation for determining a transmission symbol, in data 2 part; and
    sequentially performing differential demodulation on a correctly arranged subsequent output symbol string of the channel equalizer of the data 2 part to determine the transmission data.

10. A non-transitory computer readable storage medium storing a computer program performing a method for equalizing a channel and determining reception data of a packet communication receiver, the method comprising:
- receiving a reception sample string of a packet having a midamble and location information of the midamble;
- dividing the reception sample string into a first sub sample string and a second sub sample string using the location information of the midamble; and
- performing channel equalization on the first sub sample string and the second sub sample string, respectively, using a channel equalizing algorithm of a channel equalizer,
- wherein in the first sub sample string, a first symbol string is arranged in a first order of data 1 and the midamble and in the second sub sample string, a second symbol string is arranged in a second order of the midamble and data 2,
- wherein the performing of the channel equalization includes:
- rearranging the first order of the first sub sample string in reverse order to change arrangement of the first symbol string in a third order of a reversely arranged midamble and reversely arranged data 1;
- training a filter coefficient of the channel equalizer using a reversely arranged reference midamble symbol string as a training signal; and performing the channel equalization on the first sub sample string reversely arranged through the filter coefficient using the first sub sample string reversely arranged as an input reception signal of the channel equalizing algorithm of the channel equalizer.

* * * * *